United States Patent [19]
Abe et al.

[11] Patent Number: 5,304,907
[45] Date of Patent: Apr. 19, 1994

[54] SERVO SYSTEM THAT CONTROLS A MOTOR AND COMPENSATES FOR SYSTEM IRREGULARITIES

[75] Inventors: Fumiyoshi Abe; Takayuki Horikoshi; Akira Hasegawa, all of Kanagawa, Japan

[73] Assignee: Sony Corporation, Tokyo, Japan

[21] Appl. No.: 795,223

[22] Filed: Nov. 15, 1991

Related U.S. Application Data

[63] Continuation of Ser. No. 334,532, Apr. 7, 1989, abandoned.

[30] Foreign Application Priority Data

Apr. 7, 1988 [JP] Japan .................. 63-085750
Apr. 8, 1988 [JP] Japan .................. 63-086460

[51] Int. Cl.$^5$ .................................................. G05B 13/00
[52] U.S. Cl. ..................................... 318/611; 318/715; 318/799
[58] Field of Search ............... 318/616, 661, 608–611, 318/715, 799

[56] References Cited

U.S. PATENT DOCUMENTS

| | | | |
|---|---|---|---|
| 4,342,950 | 8/1982 | Kohzai et al. | 318/611 |
| 4,792,739 | 12/1988 | Nakamura et al. | 318/661 |
| 4,878,211 | 10/1989 | Suzuki et al. | 369/44 |
| 4,902,949 | 2/1990 | Hirata | 318/608 |
| 4,975,626 | 12/1990 | Yagi et al. | 318/567 |
| 5,021,941 | 6/1991 | Ford et al. | 364/176 |
| 5,055,756 | 10/1991 | Ohkoda et al. | 318/618 |

FOREIGN PATENT DOCUMENTS

| | | | |
|---|---|---|---|
| 0124642 | 11/1984 | European Pat. Off. | G05D 13/62 |
| 1390201 | 4/1975 | United Kingdom | G05D 13/62 |
| 1540974 | 3/1977 | United Kingdom | |
| 1570568 | 3/1978 | United Kingdom | |
| 2006481 | 5/1979 | United Kingdom | G01P 3/44 |
| 2177821 | 1/1987 | United Kingdom | |

*Primary Examiner*—William M. Shoop, Jr.
*Assistant Examiner*—Brian Sircus
*Attorney, Agent, or Firm*—Lewis H. Eslinger; Jay H. Maioli

[57] ABSTRACT

A servo system for a motor having a rotor that includes a phase detector circuit for detecting a rotational phase of the rotor and for defining a plurality of angular positions of the rotor, each angle between adjacent angular positions being of the same size, a rotating device for rotating the rotor at a predetermined constant rotational speed, a speed detector circuit for detecting a rotational speed of the rotor at each of the angular positions, an error detector circuit for detecting errors of the speed detector circuit at each of the angular positions when the rotor is rotated at the predetermined constant rotational speed, a memory for storing the detection errors at each of the angular positions, and a servo control circuit for controlling a rotational speed and/or phase of the rotor in accordance with the rotational speed detected by the speed detector circuit and the detection errors read from the memory.

10 Claims, 7 Drawing Sheets

SERVO SYSTEM THAT CONTROLS A MOTOR AND COMPENSATES FOR SYSTEM IRREGULARITIES

This is a continuation of application Ser. No. 07/334,532, filed Apr. 7, 1989 now abandoned.

BACKGROUND OF THE INVENTION

1. Field of the Invention

The present invention relates generally to a servo system for a motor having a rotor and, more particularly, is directed to a servo system for servo-controlling the rotation of a motor such as a drum motor for rotating a rotary head drum of a video tape recorder, its capstan drive motor, and a motor for driving a spindle of a disk apparatus with high accuracy.

2. Description of the Prior Art

Rotating members such as a rotary head drum of a video tape recorder and a disk drive portion of a disk apparatus have to be rotated with accuracy as high as possible, and the rotational phase thereof needs to be synchronized with an external reference signal.

Therefore, a drum drive motor and a disk drive motor are servo-controlled for their rotational speed and for their rotational phase. The speed servo is effected by controlling a frequency of a rotation detecting signal FG from a rotation detecting apparatus whose frequency corresponds to a rotational speed of a motor, and hence the rotation detecting apparatus must be high in accuracy for its detection.

The phase-servo is effected in such a fashion that the phase relation between a reference position signal PG generated once per revolution of the motor and a signal REFP indicating a reference phase is controlled to have a predetermined phase relation. Generally, the phase servo is carried out by the phase data which is available only once per revolution of the motor in order to simplify the arrangement of the phase servo loop. In this case, a very small error within one rotation of the motor is relatively small because of the inertia of the rotating member and can be ignored.

As a rotation speed detecting apparatus employed widely in the prior art, there is known a rotation detecting apparatus that comprises a rotary member and a magnetic sensor element. In this case, the rotary member which has a plurality of N and S magnetic poles magnetized at a predetermined pitch on the outer peripheral surface thereof is coaxially attached to the rotary shaft of a motor and the magnetic sensor element is located facing the outer peripheral surface of the rotary member to sense the N—S magnetic pattern.

Although the above-mentioned rotation detecting apparatus is simple in construction, it is difficult to obtain the rotation detecting apparatus which carries out the detection with high accuracy because of mechanical factors such as an error of magnetized pattern of magnetic poles of the rotary member, its eccentricity and so on. For example, even though the motor is correctly rotated at a constant speed, an error signal is generated due to the error of the magnetized pattern, causing the rotation detecting apparatus to erroneously determine that the motor is not rotated at the constant speed. Then, the servo system servo-controls the motor so as to remove the error signal such that undesired and irregular rotation is applied to the motor in order to remove the error caused by the magnetized pattern and so on. In order to solve the above-mentioned problems, there is proposed a method in which two magnetic sensor elements are located relative to the magnetized pattern at the positions displaced in phase, thereby improving the rotation detection accuracy. This previously-proposed method is disclosed in official gazette of Japanese laid-open patent No. 58-186812.

Further, the phase-servo is performed by the use of one phase data that is derived per revolution of the motor so that fine phase control within one revolution of the motor cannot be effected.

In the rotational speed control of the motor, the rotational speed of the motor is detected by measuring the cycle period of a rotation detecting signal DT having the frequency corresponding to the rotational speed of the motor and which is derived from the rotation speed detecting element coaxially attached to the rotary shaft of the motor.

This cycle measuring method has a defect that at a low speed the speed detection and hence the responsiveness in the speed control are degraded because the cycle period measuring time is increased as the rotational speed is decreased.

Therefore, in order to improve the responsiveness in the low-speed region, there is proposed a method in which, when the motor is rotated at low speed, the grade of an inclined portion of a waveform of the rotation detecting signal DT is measured. This previously-proposed method is disclosed in official gazette of Japanese laid-open patent No. 59-116050.

According to the above-mentioned method, the rotational speed of the motor can be detected on the principle that the grade of the inclined portion of the triangular wave signal generated by the rotation of the motor is proportional to the rotational speed of the motor. However, if the peak-to-peak value of the resultant triangular wave signal is not constant, the grade of the inclined portion to be detected is also changed with the result that the rotational speed cannot be accurately detected. To solve this problem, in the prior art, the gain adjustment of a triangular wave signal generator is carried out by manually adjusting its volume. In this case, however, the gain adjustment is very cumbersome and it cannot follow the changes due to temperature and aging.

OBJECTS AND SUMMARY OF THE INVENTION

Accordingly, it is an object of the present invention to provide an improved servo system for a motor having a rotor which can remove the afore-noted defects.

Another object of the present invention is to provide a servo system for a motor having a rotor which can obtain highly-accurate speed and phase data of a rotor by correcting errors caused by mechanical factors.

Still another object of the present invention is to provide a servo system for a motor having a rotor which can automatically adjust the gain of a signal having a frequency proportional to a rotational speed of a motor, thereby detecting a rotational speed with high accuracy.

A further object of the present invention is to provide a servo system for a motor having a rotor which can always effect accurate rotation control regardless of a rotational speed of a motor.

In accordance with an aspect of the present invention, there is provided a servo system for a motor having a rotor which includes a phase detector element for detecting a rotational phase of the rotor and for defining a plurality of angular positions of the rotor, each angle between adjacent the angular positions being equal, a rotating element for rotating the rotor at a predetermined constant rotational speed, a speed detector element for detecting a rotational speed of the rotor at each of the angular positions, an error detector element for detecting detection errors of the speed detector element at each of the angular positions when the rotor is rotated at the predetermined constant rotational speed, a memory element for storing the detection errors at each of the angular positions, and a servo controlling system for controlling a rotational speed and/or phase of the rotor in accordance with the rotational speed detected by the speed detector and the detection errors read from the memory element.

In accordance with other aspect of the present invention, there is provided a servo system for a motor having a rotor which includes a:

frequency generator element for generating a recurrent signal which is cyclical and has generally linear portions, the frequency of the recurrent signal being proportional to a rotational speed of the rotor, and first speed detector element for detecting the rotational speed of the rotor by detecting time in which the rotor rotates for a predetermined angle and for outputting a first speed signal, a second speed detector element for detecting the rotational speed of the rotor by detecting a grade of the linear portion of the recurrent signal and for outputting a second speed signal, a comparing system for comparing the first and second speed signals and for outputting a compared result, a gain control system for controlling a gain of the recurrent signal according to the compared result of the comparing element so that the first and second speed signals become equal, and a servo control system for controlling the rotational speed of the rotor in accordance with one of the first and second speed signals.

In accordance with a further aspect of the present invention, there is provided a servo system for a motor having a rotor which includes a frequency generator element for generating first and second recurrent signals each of which is cyclical and has generally linear portions separated by non-linear portions, the frequency of the recurrent signals being proportional to the rotating speed of the rotor, and the recurrent signals being angularly displaced from each other so that the non-linear portions of one occur approximately in the middle of the linear-portion of the other, a first speed detector element for detecting a rotational speed of the rotor by detecting time in which the rotor rotates for a predetermined angle and for outputting a first speed signal, a second speed detector element for detecting the rotational speed of the rotor by detecting a grade of the linear portions of the first and second recurrent signals and for outputting a second speed signal, a comparing element for comparing the first and second speed signals and for outputting a compared result, and a gain control system for controlling gains of the first and second recurrent signals according to the compared result so that the first and second speed signals become equal.

In accordance with a yet further aspect of the present invention, there is provided a servo system for a motor having a rotor including a frequency generator element for generating a recurrent signal which is cyclical and has generally linear portions, the frequency of the recurrent signal being proportional to a rotational speed of the rotor, a speed detector element for detecting the rotational speed of the rotor by detecting a grade of the linear portion of the recurrent signal, a peak detector element for detecting a peak-to-peak value of the recurrent signal, a gain control system for controlling a gain of the recurrent signal according to an output of the peak detector so that the peak-to-peak value of the recurrent signal becomes equal to a predetermined value, and a servo control system for controlling the rotational speed of the rotor in accordance with an output of the speed detector element and a speed reference signal.

The preceding and other objects, features and advantages of the present invention will be apparent from the following detailed description of preferred embodiments which are to be read in conjunction with the accompanying drawings, wherein like reference numerals identify the same or similar elements.

DETAILED DESCRIPTION OF PREFERRED EMBODIMENTS

The present invention will now be described in detail with reference to the drawings.

Figure 1:
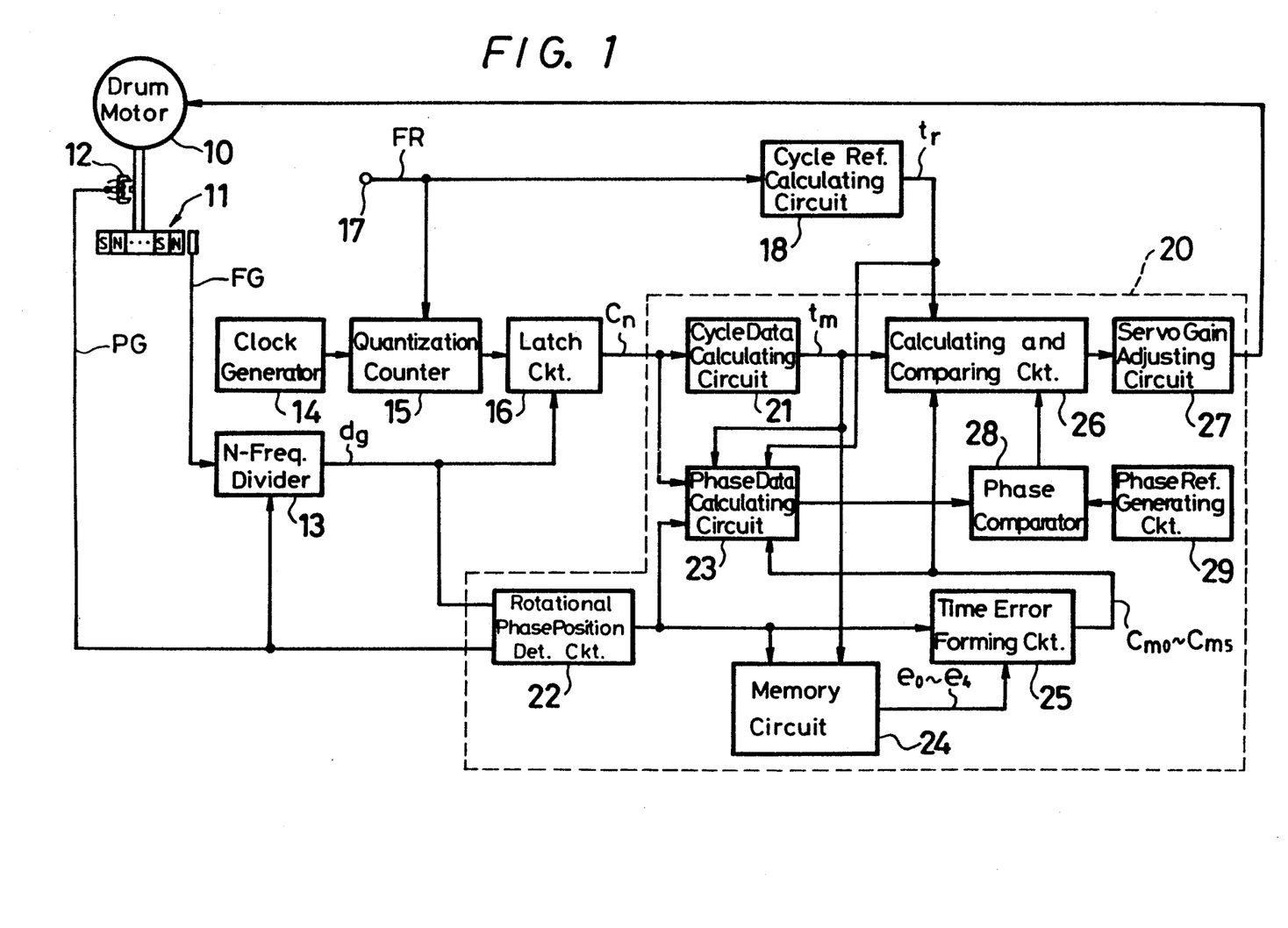
FIG. 1 is a block diagram showing an embodiment of a servo system according to the present invention.

FIG. 1 is a block diagram showing an embodiment of a servo system for a motor having a rotor according to the present invention.

As FIG. 1 shows, a drum motor 10 having rotating means such as a rotor (direct current motor) is provided to drive, for example, a rotating drum of a video tape recorder (VTR). In this embodiment, the drum motor 10 is rotated one revolution per ½ frame of a video signal.

Figures 2A, 2B:
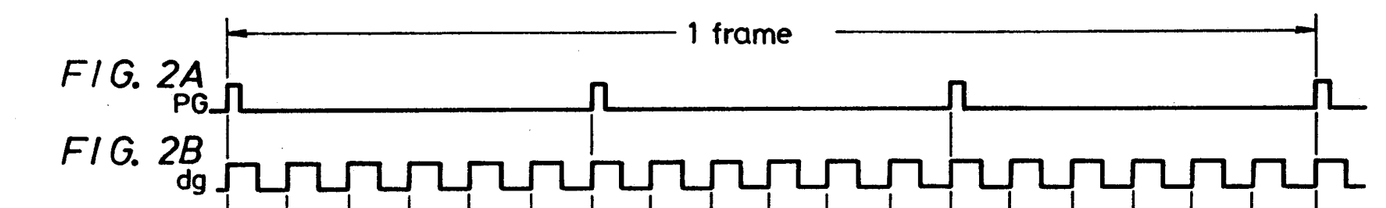
FIGS. 2A to 2H are timing charts used to explain the operation of the servo system shown in FIG. 1, respectively.

The drum motor 10 is attached at its rotary shaft of the rotor with phase detector means such as a rotation detecting apparatus 11 and a pulse generator 12 that generates a reference position signal for a rotational phase. The rotation detecting apparatus 11 generates a rotation detecting signal FG whose frequency corresponds to the rotational speed of the drum motor 10. In this case, the rotation detecting signal FG has 48 cycles per one revolution of the drum motor 10. The rotation detecting signal FG is supplied to a divide-by-N frequency dividing circuit 13 (hereinafter referred to as an N-frequency dividing circuit), in which N is 8. Thus, the N-frequency dividing circuit 13 generates a signal dg having 6 cycles per one revolution of the drum motor 10. The N-frequency dividing circuit 13 is also supplied with the rotational position pulse PG that is generated by the pulse generator 12 for each revolution of the drum motor 10. Then, the N-frequency dividing circuit 13 is reset in response to the rotational position pulse PG which is shown in FIG. 2A. Thus, the output signal dg from the N-frequency dividing circuit 13 is synchronized with the rotational position pulse PG in phase as shown in FIG. 2B.

Figure 2C:
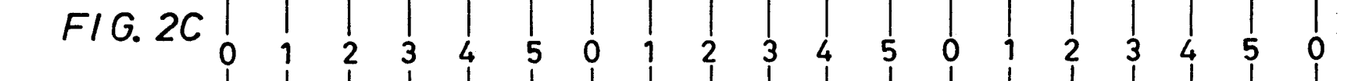

The output signal dg of the N-frequency dividing circuit 13 and the rotational position pulse PG are supplied to error detector means such as a rotational phase position detecting circuit 22. The detecting circuit 22 is formed of, for example, a counter in which the pulse PG is supplied to the reset terminal of the counter and the signal dg is supplied to the clock terminal thereof. The detecting circuit 22 therefore generates numbers [0], [1], [2], [3], [4] and [5] (see FIG. 2C) that indicate six rotational angular positions $S_0, S_1, S_2 \ldots S_5$ which are calculated at every rotational angle of $360°/6 = 60°$ $60°$ with the generation position of the pulse PG as the reference.

A clock generator 14 is provided which generates a clock signal whose frequency is sufficiently higher than that of the rotation detecting signal FG. The clock signal from the clock generator 14 is supplied to a clock terminal of a quantization counter 15. On the other hand, an external reference signal FR with the frame cycle of a video signal (see FIG. 2H) is supplied through a terminal 17 to the reset terminal of the quantization counter 15 so that the output count value of the quantization counter 15 includes phase information of the external reference signal FR of the frame cycle.

Figure 2D:
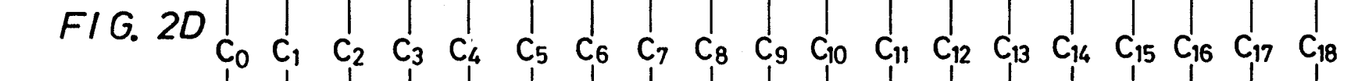

The output count value of the quantization counter 15 is supplied to a data input terminal of a latch circuit 16. The signal dg from the frequency dividing circuit 13 is supplied to the latch circuit 16 as a latch pulse. Accordingly, as shown in FIG. 2D, in the latch circuit 16, there are sequentially latched count values $C_0, C_1, C_2 \ldots C_n$ (n is a positive integer) of the quantization counter 15 at the respective rotational phase positions $S_0$ to $S_5$ at every rotational angular position of $60°$ with the reset time point by the external reference signal FR as the reference. The latched output $C_n$ of the latch circuit 16 is supplied to a cycle period calculating circuit 21. The cycle period calculating circuit 21 calculates as the count values of the quantization counter 15, times $t_0, t_1, t_2, t_3, t_4$ and $t_5$ in which the motor or rotor rotates between adjacent two rotational phase positions $S_0$ and $S_1$, $S_1$ and $S_2$, $S_2$ and $S_3$, $S_3$ and $S_4$, $S_4$ and $S_5$ and $S_5$ and $S_0$. Thus, $$t_0 = C_1 - C_0$$
$$t_1 = C_2 - C_1$$
$$t_2 = C_3 - C_2$$
$$t_3 = C_4 - C_3$$
$$t_4 = C_5 - C_4$$
$$t_5 = C_6 - C_5$$
$$t_0 = C_7 - C_6$$
$$t_1 = C_8 - C_7$$

The thus obtained cycle period $t_m$ (m = 0 to 5) are supplied to a calculating and comparing circuit 26.

The reference signal FR of frame cycle from the terminal 17 is supplied to a cycle reference calculating circuit 18. The calculating circuit 18 performs the calculation expressed as $$TFR \times \tfrac{1}{3} \times 8/48 = t_r$$

where TFR is one cycle of the reference signal FR. The resultant reference cycle $t_r$ corresponds to the rotational time of the rotational angular extent of $60°$ and is supplied to the calculating and comparing circuit 26.

Figures 2E, 2F:
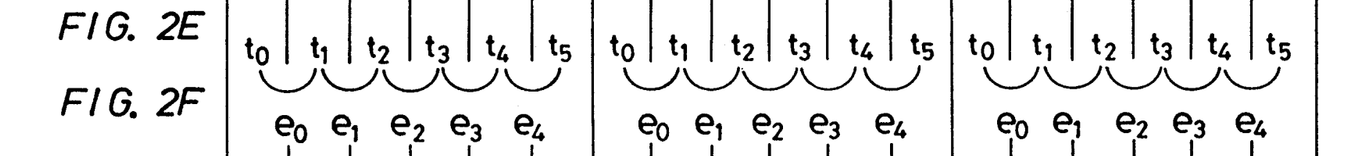
Figure 2G:
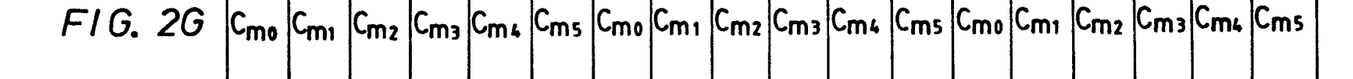
Figure 2H:
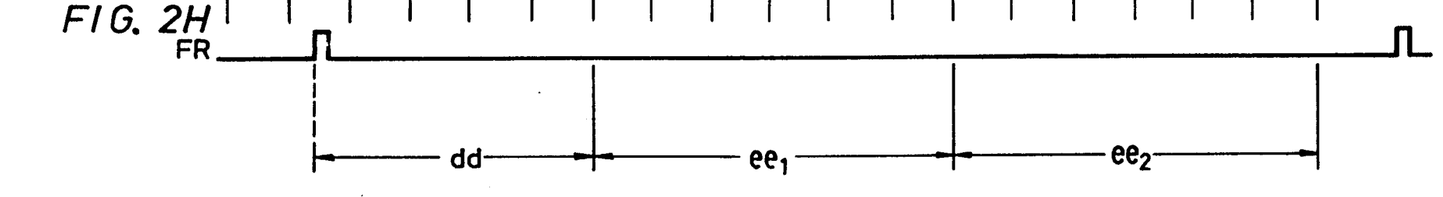

A memory circuit 24 is provided which is formed of a non-volatile memory that stores error data. The memory circuit 24 stores, as will be described later, error data $e_0$ to $e_4$ (see FIG. 2F) concerning time errors $C_{m0}, C_{m1} \ldots C_{m5}$ (see FIG. 2G) which are brought about by mechanical factors relative to the rotational times between two adjacent rotational phase positions $S_0$ and $S_1$, $S_1$ and $S_2$, $\ldots$ $S_4$ and $S_5$, $S_5$ and $S_0$. To the memory circuit 24, there are supplied positional data [0], [1] $\ldots$ [5] with respect to the rotational phase positions $S_0$ to $S_5$ from the rotational phase position detecting circuit 22 designated as read address signals. Thus, the error data $e_0$ to $e_4$ are read out of the memory circuit 24 and are fed to a time error correcting circuit 25. The time error correcting circuit 25 receives the positional data from the rotational phase detecting circuit 22 and produces the time errors $C_{m0}$ to $C_{m5}$ which are caused by the mechanical factors between the adjacent two rotational phase positions $S_0$ and $S_1$ to $S_5$ and $S_0$. The time errors $C_{m0}$ to $C_{m5}$ are supplied to the calculating and comparing circuit 26.

In the calculating and comparing circuit 26, the reference cycles $t_r$ between the two adjacent rotational phase positions $S_0$ and $S_1$ to $S_5$ and $S_0$ are respectively corrected by the time errors $C_{m0}$ to $C_{m5}$ and are obtained as corrected reference cycle data $r_0$ to $r_5$ expressed as $$r_0 = t_r + C_{m0}$$
$$r_1 = t_r + C_{m1}$$
$$r_2 = t_r + C_{m2}$$
$$r_3 = t_r + C_{m3}$$
$$r_4 = t_r + C_{m4}$$
$$r_5 = t_r + C_{m5}$$

The calculating and comparing circuit 26 compares the corrected reference cycle data $r_0$ to $r_5$ with the measured cycle data $t_0$ to $t_5$ to thereby produce a speed servo error signal. The speed servo error signal is added with a phase servo error signal that will be described later, and is supplied through a servo gain adjusting circuit 27 to the drum motor 10, thus the drum motor 10 being servo-controlled in speed.

While the reference cycle data $t_r$ are corrected by the time errors as described herein-above, the cycle data $t_m$ may be corrected by the time errors and then are compared with the reference cycle data $t_r$. The cycle data $t_m$ obtained immediately after the reset by the signal FR is not used.

The phase-servo will be described next.

The output data $C_n$ from the latch circuit 16, the rotational phase position signal from the rotational phase position detecting circuit 22, the cycle data $t_m$ from the cycle data calculating circuit 21 and the time errors $C_{m0}$ to $C_{m5}$ from the time error forming circuit 25 are supplied to a phase data calculating circuit 23. Also, the reference cycle data $t_r$ from the cycle reference calculating circuit 18 is fed to the phase data calculating circuit 23.

The phase data calculating circuit 23 receives the latch output $C_n$ produced at a time in which the first pulse PG is produced immediately after the quantization counter 15 is reset by the external reference signal FR. The latch output is designated by reference letter dd (see FIG. 2H). The rotational phase is servo-controlled in such a manner that the latch output dd becomes equal to a phase reference REF (corresponding to a locking-phase difference between the external synchronizing signal FR and the pulse PG).

Prior to the description of the phase servo error in this embodiment, let us first consider a case in which the phase data calculating circuit 23 produces a phase servo error at the cycle of the pulse PG, or once per one revolution of the drum motor 10. In this case, the phase data calculating circuit 23 latches the output of the latch circuit 16 at the cycle of the pulse PG. $q_0, q_1, q_2, \ldots$ assume latched outputs where $q_0 = dd$. Then, the cycle of the pulse PG is calculated as the count value of the quantization counter 15. Assuming that this count value is $ee_n$, then the following equation will be satisfied as $$ee_n = q_n - q_{n-1} (n = 1, 2, \ldots)$$

Phase data $HDP_n$ of the cycle of the pulse PG is obtained as $$HDP_0 = dd$$
$$HDP_1 = HDP_0 + (ee_1 - PGREF)$$
$$\vdots$$
$$HDP_n = HDP_{n-1} + (ee_n - PGREF)$$

where PGREF is the cycle of the correct pulse PG, or the count value of the quantization counter 15 corresponding to the ⅙ frame cycle in this embodiment.

By comparing the thus described phase data $HDP_n$ (n=0, 1, 2, 3, ...) with the phase reference REF, it is possible to obtain one phase servo error per one revolution of the drum motor 10. In the present embodiment, however, one phase servo error is not produced per one revolution of the drum motor 10 but phase servo errors are respectively produced at six rotational phase positions $S_0$ to $S_5$ per one revolution of the drum motor 10.

This embodiment utilizes the cycle data $t_m$ and the reference cycles $r_m$ which are corrected by the time errors $C_{m0}$ to $C_{m5}$. More specifically, the phase data $PH_n$ at the respective rotational phase positions $S_0$ to $S_5$ are given as $$PH_0 = dd + (t_0 - (t_r + C_{m0}))$$
$$= dd + (t_0 - r_0)$$
$$PH_1 = PH_0 + (t_1 - r_1)$$
$$PH_2 = PH_1 + (t_2 - r_2)$$
$$\vdots$$
$$PH_n = PH_{n-1} + (t_n - r_n)$$

Thus, the phase data calculating circuit 23 produces six phase data $PH_n$ per one revolution of the drum motor 10, and they are fed to a phase comparator 28. The phase comparator 28 receives the phase reference REF from a phase reference generating circuit 29 and compares it with the phase data $PH_n$, thereby producing six phase servo errors per one revolution of the drum motor 10. The resultant phase servo errors are supplied to the calculating and comparing circuit 26, in which they are added with the speed servo errors.

In this phase-servo operation, the cycle data generated just after the quantization counter 15 is reset by the signal FR is by-passed and is not utilized.

The writing of error data on the memory circuit 24 will be described herein-below.

In order to obtain the error data, at first, the drum motor 10 is rotated at a constant speed by the inertia of the drum.

The requirements for the error data are as follows:

(1) the drum motor 10 has to be rotated alone or load fluctuation factors such as a tape and the like to the drum motor are removed;

(2) the phase servo to drum motor is stopped;

(3) the servo gain in the speed servo loop is decreased; and (4) the rotational speed of the drum motor 10 is increased when the constant rotation of the drum motor 10 by the inertia of the drum is not sufficiently smooth. In this case, if the measured cycle of the error data is $T_1$ when $T_0$ represents an actual servo cycle, the error data will be obtained such that the multiplication of $T_0/T_1$ is performed in the time error correcting circuit 25 thereby to correct the error data $e_0$ to $e_4$. Of course, the thus corrected error data $e_0$ to $e_4$ may be stored in the memory circuit 24.

The above-mentioned requirements (2) and (3) are not always needed. But instead, if it is arranged to reduce the servo errors to zero on the assumption that the servo gain is not infinite, the drum motor 10 may be phase-servo-controlled and the speed servo gain does not have to be decreased.

In the above-mentioned state that the drum motor 10 is rotated at the constant speed, the afore-noted cycle data $t_m$ (m=0 to 5) are calculated per one revolution of the drum motor 10. Then, the accuracy error data $e_0$ to $e_4$ between the cycle data $t_m$ and the cycle data $t_0$ are calculated as $$e_0 = t_1 - t_0$$
$$e_1 = t_2 - t_0$$
$$e_2 = t_3 - t_0$$
$$e_3 = t_4 - t_0$$
$$e_4 = t_5 - t_0$$

The difference between the cycle data $t_m$ and the reference cycle $t_r$ is not calculated but the error between the cycle data $t_0$ and the cycle data $t_m$ is calculated in order to reduce the amount of data stored in the memory circuit 24 by the amount of the cycle data $t_0$.

The error data $e_0$ to $e_4$ are calculated over a plurality of rotations of the drum motor 10 similar to the above manner and are then averaged. If satisfactory accuracy is obtained, the error data $e_0$ to $e_4$ are written in the memory circuit 24.

Since the error data $e_0$ to $e_4$ are not error data between the reference cycle $t_r$ and the cycle data $t_m$ as earlier noted, the time error correcting circuit 25 generates the time errors $C_{m0}$ to $C_{m5}$ between the cycle data $t_m$ and the reference cycle $t_r$. The calculating equations therefor are given as follows.

$$C_{m0} = 0 + K = t_0 - t_r$$
$$C_{m1} = e_0 + K = t_1 - t_r$$
$$C_{m2} = e_1 + K = t_2 - t_r$$
$$C_{m3} = e_2 + K = t_3 - t_r$$
$$C_{m4} = e_3 + K = t_4 - t_r$$
$$C_{m5} = e_4 + K = t_5 - t_r$$

where $$K = -\frac{e_0 + e_1 + \ldots + e_4}{6}$$

In the foregoing, $C_{m0}+C_{m1}+C_{m5}=0$ is satisfied per one revolution of the drum motor 10.

In the writing-process of error data $e_0$ to $e_4$, the equality is satisfied as $$t_0+t_1+\ldots+t_5=6\,t_r$$

While in the above embodiment the non-volatile memory is used as the memory circuit 24 as described above, the following modification is also possible. In the video tape recorder, there is such a case that the rotating drum is not applied with a load (or a tape is not wound around the rotating drum). Thus, at every time that the rotating drum is not applied with a load, the error data are refreshed by writing the error data $e_0$ to $e_4$ in a RAM (random access memory) provided as the memory circuit 24, whereby the servo system of the invention can always be effected following temperature and aging changes and so on.

The present invention can be applied to a servo system for a motor having a rotor which is required to rotate with great accuracy as well as the servo system of the drum motor in the video tape recorder.

Figure 3:
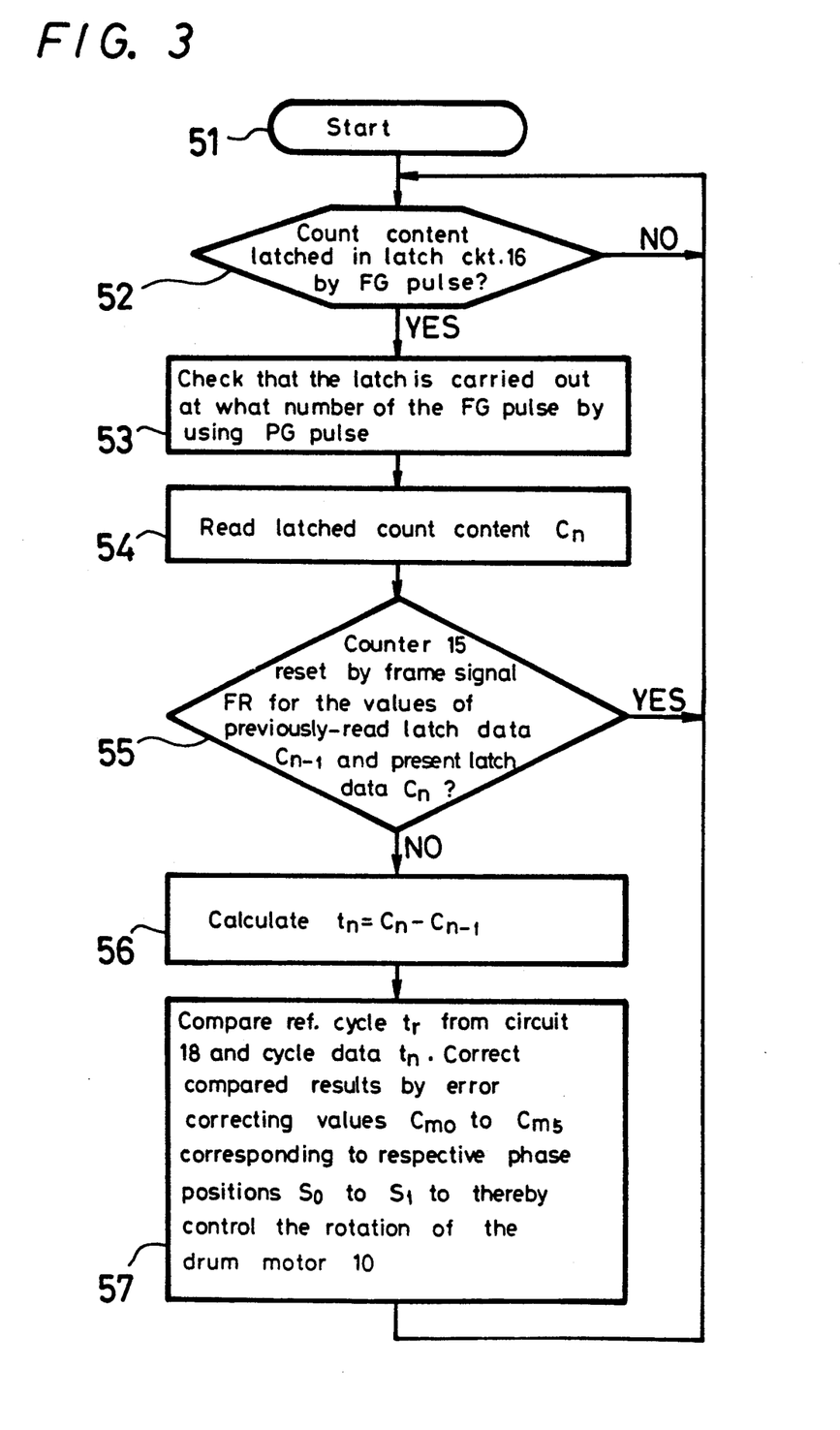
FIG. 3 is a flow chart to which reference will be made in explaining the operation of a microcomputer that carries out the operation of the block shown by a broken line in FIG. 1.

The servo error generating circuit shown by a broken line 20 in FIG. 1 may be realized by software utilizing a microcomputer. FIG. 3 is a flow chart of an example of the algorithm of a servo loop in that case and is useful in explaining the operation thereof.

Referring to FIG. 3, the routine begins with step 51, and it is determined at the next decision step 52 whether or not the count content of the quantization counter 15 is latched in the latch circuit 16 by the FG pulse from the N-frequency dividing circuit 13. If the count content is latched by the FG pulse as represented by a YES at step 52, the routine proceeds to step 53. Step 53, it is checked that the latch is carried out at what number of the FG pulse by using the PG pulse. This is equivalent to determining which of the rotational phase positions $S_0$ to $S_5$ the count content of the quantization counter 15 is latched at. Then, the latched count content $C_n$ is read at step 54. The routine proceeds to the next decision step 55, and it is determined at step 55 whether or not the quantization counter 15 is reset by the frame signal FR for the values of the previously-read latch data $C_{n-1}$ and the present latch data $C_n$. If the quantization counter 15 is reset by the frame signal FR as represented by a YES at step 55, the latched content is ignored and the routine returns to step 51. If the quantization counter 15 is not reset by the frame signal FR as represented by a NO at step 55, cycle data $t_n=C_n-C_{n-1}$ is calculated at step 56. Then, the routine proceeds to step 57, and in step 57, the reference cycle $t_r$ from the cycle reference calculating circuit 18 and the cycle data $t_n$ obtained at step 56 are compared with each other. The compared results are corrected by the error correcting values $C_{m0}$ to $C_{m5}$ corresponding to the respective rotational phase positions $S_0$ to $S_1$ to thereby control the rotation of the drum motor 10.

The N-frequency dividing circuit 13 is used to determine the number of rotational phase positions per one revolution of the drum motor 10. The frequency-dividing ratio of the N-frequency dividing circuit 13 may be selected freely, and the N-frequency dividing circuit 13 may be omitted. Further, the time error data $C_{m0}$ to $C_{m5}$ may be directly stored in the memory circuit 24.

According to the present invention, as described above, even if there is a fixed distortion caused by the mechanical factors during one revolution of the drum motor, the speed control can be precisely effected by the use of error data corresponding to the plurality of rotational phase positions per one revolution of the drum motor and stored in the memory circuit. Therefore, the servo gain can be increased and hence, a powerful servo performance against external disturbance can be obtained.

If one rotational reference phase position is produced per one revolution of the drum motor, the accurate phase position information can be obtained by using error data at a plurality of rotational phase positions per one revolution. Thus, a plurality of phase data can be obtained per one revolution of the drum motor and hence the phase-servo can be improved in efficiency.

Another embodiment of the servo system according to the present invention will be described in accordance with another aspect of the present invention.

Figure 4:
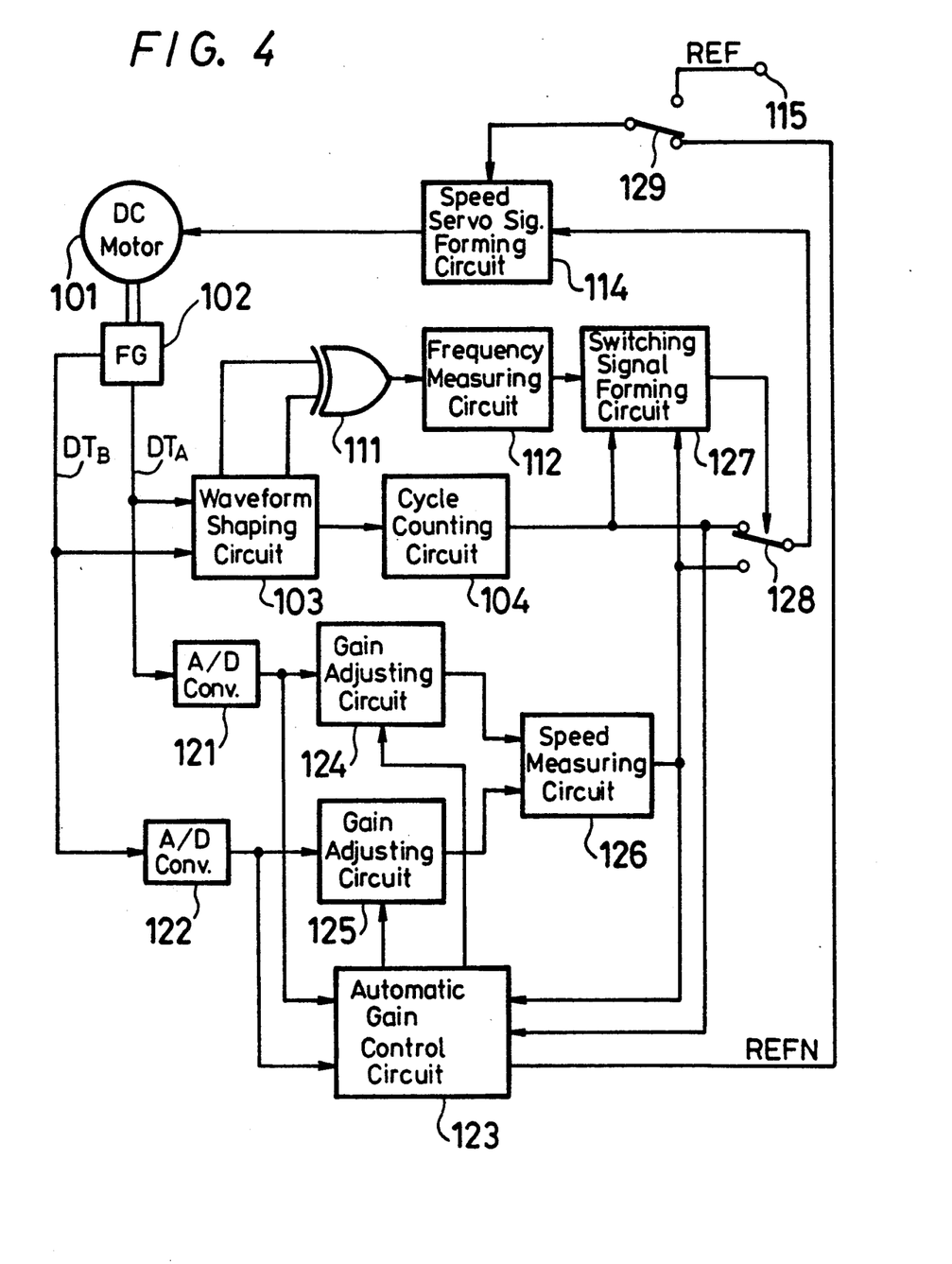
FIG. 4 is a block diagram showing another embodiment of a servo system according to the present invention.

FIG. 4 shows an example of a speed control circuit according to the present invention whose responsiveness in the low-speed region is improved.

Referring to FIG. 4, there is provided a direct current motor 101. A rotation detecting element 102 is coaxially connected to the rotary shaft of the direct current motor 101. The rotation detecting element 102 generates sinusoidal two-phase rotation detecting signals $DT_A$ and $DT_B$ whose frequencies are proportional to the rotational speed of the motor 101 and of which the phases are different from each other by 90°. In this embodiment, the rotation detecting signals $DT_A$ and $DT_B$ are supplied to and are converted to pulse signals by a waveform shaping circuit 103 that is formed of a comparator. A signal having a frequency twice as high as the original one, which results from passing either or both of the pulse-converted rotation detecting signals $DT_A$ and $DT_B$ from the waveform shaping circui 103 through an exclusive-OR gate 111 is supplied to a cycle counting circuit 104 which carries out the cycle period measuring by counting the number of clocks, for example, between the leading and trailing edges. Although the output from the cycle counting circuit 104 represents the detected rotational speed of the motor 101, the responsiveness in the low speed mode is not satisfactory. The reason for this is that, as described before, the time necessary for counting the cycle is increased with the decrease of the rotational speed of the motor and the rotational speed measured by the cycle counting operation becomes an average rotational speed during the counting period.

Figures 5A, 5B:
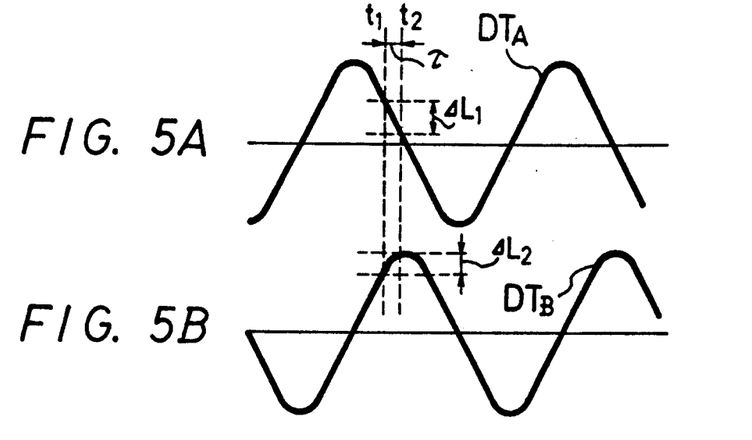
FIGS. 5A and 5B are, respectively, waveform diagrams of FG signals used to explain the speed detection shown in FIG. 4.

The two-phase rotation detecting signals $DT_A$ and $DT_B$ from the rotation detecting element 102 are supplied to analog-to-digital (A/D) converters 121 and 122, respectively. In the A/D converters 121 and 122, as shown in FIGS. 5A and 5B, the levels of the signals $DT_A$ and $DT_B$ are respectively sampled at two time points $t_1$ and $t_2$ that are distant by period $\tau$. This period $\tau$ is shorter than the cycle (cycle in which the motor 101 is rotated at low speed) of the signal $DT_A$ and $DT_B$. The sampled values are supplied through gain control means such as gain adjusting circuits 124 and 125 to a speed measuring circuit 126. The speed measuring circuit 126 calculates level differences $\Delta L_1$ and $\Delta L_2$ of the sampled values at two time points as shown in FIGS. 5A and 5B and determines the larger level difference. Then, the grade of the signal between the time points $t_1$ and $t_2$ is calculated from the larger level difference. This grade becomes steep as the frequency becomes higher while it becomes gentle as the frequency becomes low, if peak-to-peak value of the signals $DT_A$ and $DT_B$ is constant so that the grade corresponds to the frequency of the signals $DT_A$ and $DT_B$. Accordingly, the rotational speed can be calculated from the grade, namely, the level difference between the time points $t_1$ and $t_2$.

The reason that the rotational speed is calculated from the larger level difference of the rotation detecting signals $DT_A$ and $DT_B$ having two phases which are different by 90° between the time points $t_1$ and $t_2$ is that the rotational speed has to be calculated from the level difference of the signals $DT_A$ and $DT_B$ between the two time points wherein their grades are substantially straight. As shown in FIGS. 5A and 5B, the larger level difference of the two signals $DT_A$ and $DT_B$ always corresponds to the level difference between the two time points in substantially the straight line. Further, in this embodiment, a plurality of measured results, for example, three measured results are averaged as a final speed detected output so as to improve the detection accuracy. In this case, the measuring may be effected about once per cycle of the signals $DT_A$ and $DT_B$ and is effected a plurality of times for each cycle of the rotor.

The speed detected output from the speed measuring circuit 126 and the speed detected output from the cycle measuring circuit 104 are respectively supplied to one and the other fixed contacts of a switching circuit 128. On the other hand, the pulse-shaped signals $DT_A$ and $DT_B$ from the waveform-shaping circuit 103 are supplied to an exclusive-OR gate 111 from which is derived the signal having a frequency twice as high as that of the signals $DT_A$ and $DT_B$. This signal is supplied to the frequency measuring circuit 112 which measures its frequency and produces an output corresponding to the rotational speed. The output corresponding to the rotational speed from the frequency measuring circuit 112 is supplied to a switching signal forming circuit 127. The switching signal forming circuit 127 generates a switching signal SW which goes to level [1] when the rotational speed is higher than a predetermined speed and which goes to level [0] when the rotational speed is lower than the predetermined speed. The switching circuit 128 responds to the switching signal SW to connect its movable contact to the fixed contact which selects the output of the cycle measuring circuit 104 upon high speed and to the other fixed contact which selects the output of the speed measuring circuit 126 upon low speed, respectively. The speed detected output from the switching circuit 128 is supplied to a speed servo signal forming circuit 114, in which it is compared with the speed reference signal REF applied thereto from a terminal 115. The speed servo signal forming circuit 114 generates a speed servo error signal on the basis of the compared output. The resulting speed servo error signal is supplied to the direct current motor 101 and the motor 101 is servo-controlled in such a manner that the rotational speed thereof becomes equal to the speed corresponding to the speed reference signal REF.

When the speed detected output from the cycle period measuring circuit 104 and the speed detected output from the speed measuring circuit 126 are selectively switched by the switching circuit 128 and then fed to the speed servo signal forming circuit 114, the switching circuit 128 is not changed in position between the low speed and the high speed but may be changed in position even in the low speed between the constant speed mode (equal speed mode) and the transition speed mode. The switching circuit 128 is changed in position so as to always select the detected output of the cycle measuring circuit 104.

To this end, the output signal from the frequency measuring circuit 112 is supplied to the switching signal forming circuit 127 which therefore determines whether the rotational speed of the motor 101 is low or high. Also, the output from the cycle measuring circuit 104 and the output from the speed detecting circuit 126 are supplied to the switching signal forming circuit 127 which therefore determines the constant speed rotation mode and the transition speed mode, or the high acceleration and deceleration speed modes (in the low speed region). In other words, the determination of the latter mode will be made as follows. The output of the cycle measuring circuit 104 becomes equal to the average value within one cycle of the output signals $DT_A$ and $DT_B$ and the output of the speed measuring circuit 126 is nearly equal to the momentary value so that

| acceleration mode: | speed measured output > cycle measured output |
|---|---|
| deceleration mode: | speed measured output < cycle measured output | are utilized, whereby if a difference therebetween is more than the predetermined value, the mode is determined as the transition mode by the acceleration or deceleration.

When the switching circuit 128 is changed in position as described above, the high-speed response can be effected upon the transition mode and the accurate control can be effected upon the constant speed mode.

In this embodiment, in order to improve the measuring accuracy of the speed measuring circuit 126, the gains for the signals $DT_A$ and $DT_B$ are automatically adjusted. In addition, it is determined whether the signals $DT_A$ and $DT_B$ are satisfactory or not.

To this end, the digital values from the A/D converters 121 and 122 are supplied to an automatic gain control circuit 123. The automatic gain control circuit 123 calculates the peak-to-peak value between the rotation detected signals $DT_A$ and $DT_B$ having two phases or phases A and B. On the basis of the peak-to-peak value, gain adjusting signals are respectively supplied from the automatic gain control circuit 123 to the gain adjusting circuits 124 and 125 which are controlled to provide predetermined peak-to-peak values of the signals $DT_A$ and $DT_B$, respectively.

Figure 6:
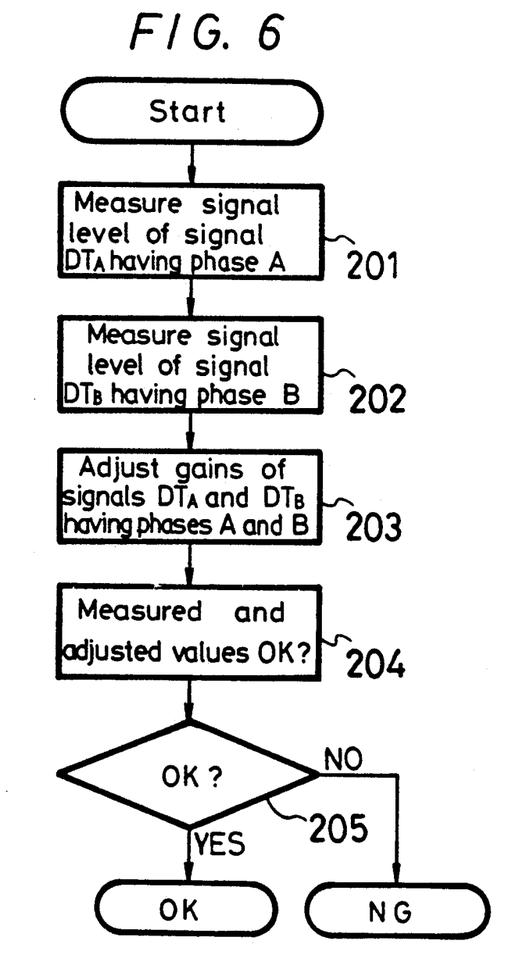
FIGS. 6 to 10 are flow charts to which reference will be made in explaining the operation of the servo system according to the present invention, respectively.
Figure 7:
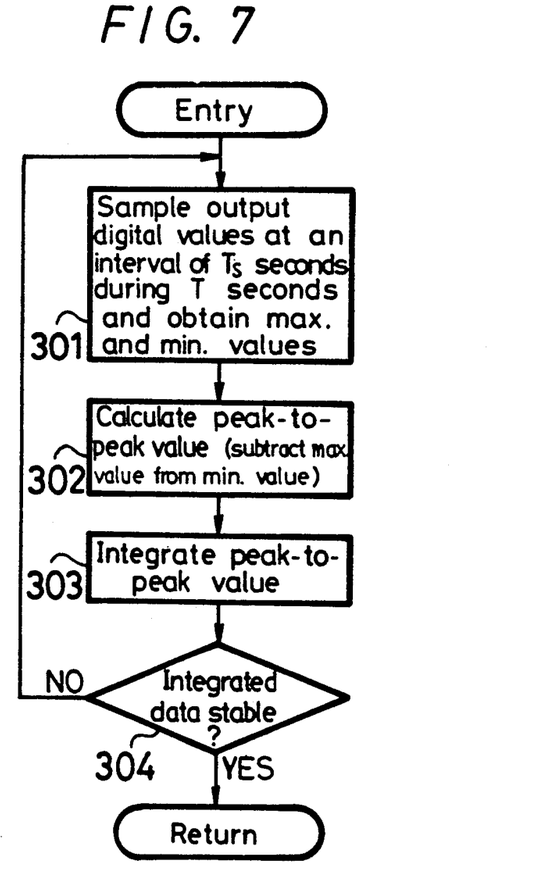
Figure 8:
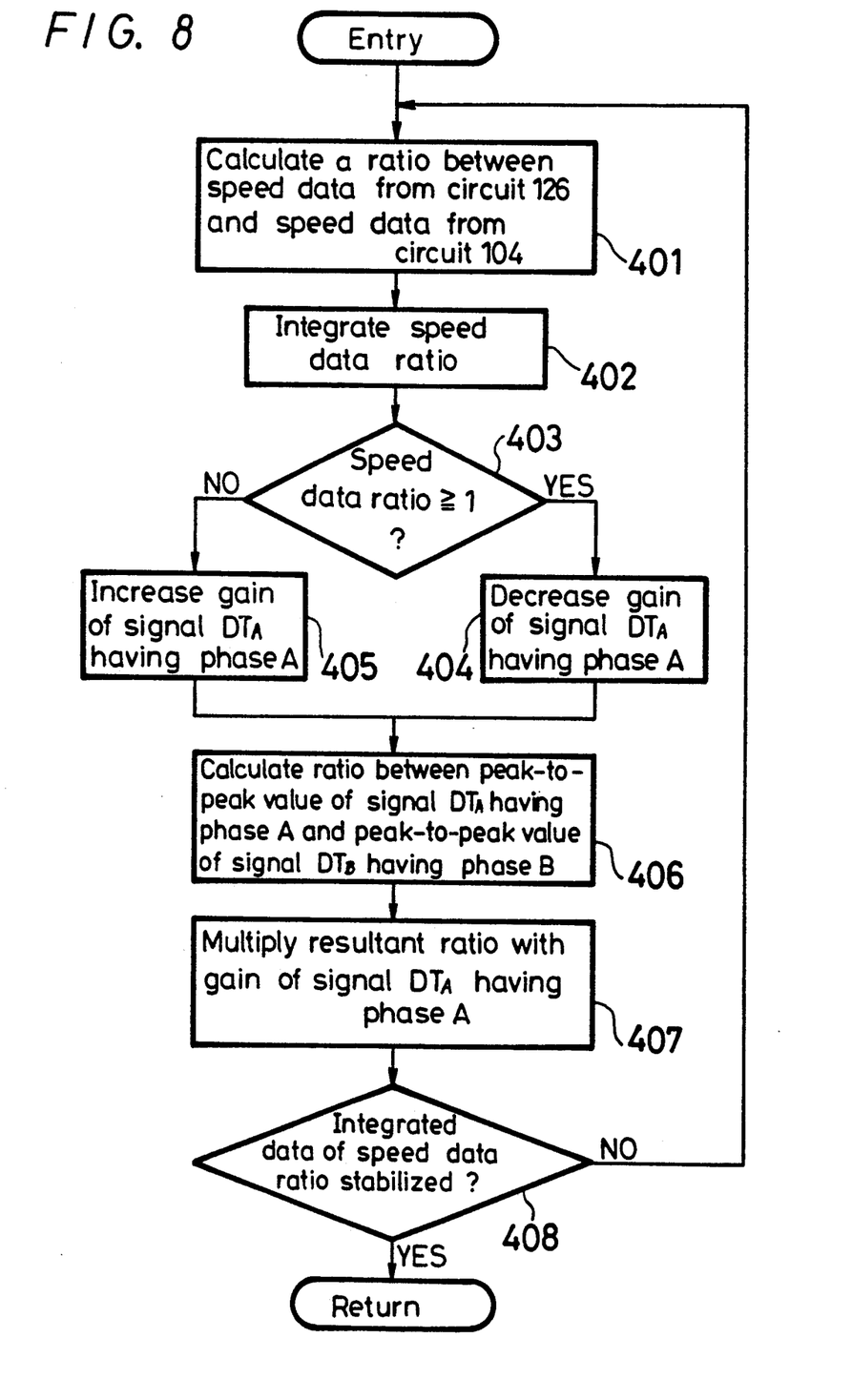
Figure 9:
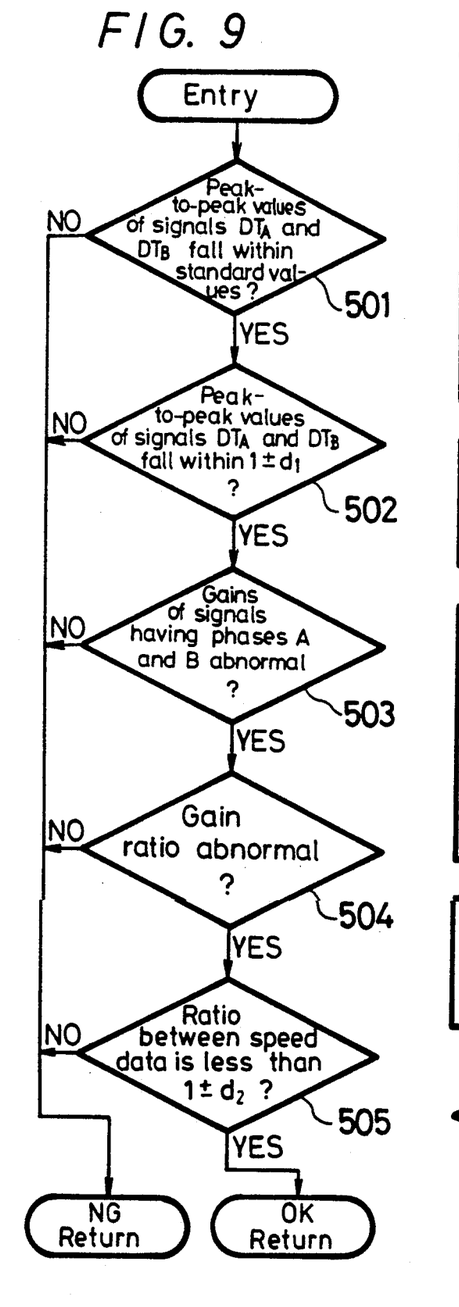

FIGS. 6 to 9 are, respectively, flow charts used to explain an example of the processing made by the automatic gain control circuit 123. FIG. 6 is a flow chart of a main routine for automatic gain adjustment and FIGS. 7, 8 and 9 are flow charts of sub-routines each explaining one step in the main routine of FIG. 6, respectively.

The automatic gain control operation is effected before the direct current motor 101 is operated. In the motors such as a capstan motor of a video tape recorder having relatively long time period in which the motor is not used, the time period in which the motor is not used is utilized to effect the automatic gain control at any time. Further, the automatic gain control operation is effected under the condition that the motor is rotated at low speed because the speed measuring circuit 126 is used in the rotation at low speed.

Referring initially to the main routine of FIG. 6, at first, in order to form data that is used to adjust the level (peak-to-peak value) of the rotation detecting signal, the signal level (or peak-to-peak value) of the rotation detecting signal $DT_A$ having the phase A is measured at step 201. Also, the signal level (or peak-to-peak value) of the rotation detecting signal $DT_B$ having the phase B is measured for serving the same purpose as in step 202. The sub-routine for measuring the signal levels of the rotation detecting signals $DT_A$ and $DT_B$ having the phases A and B at steps 201 and 202 are illustrated in a flow chart of FIG. 7. In this case, the algorithms therefor are the same for the rotation detecting signals $DT_A$ and $DT_B$ having the phases A and B.

As shown in FIG. 7, the output digital values from the A/D converters 121 and 122 which are sampled at an interval of $T_S$ seconds and analog-to-digital-converted are latched during a period of T seconds (T is more than one cycle of the signals $DT_A$ and $DT_B$) and the maximum and minimum values thereof are obtained at step 301. Then, the peak-to-peak value is calculated by subtracting the minimum value from the maximum value at step 302. At the next step 303, a difference between the resulting peak-to-peak value and the previously-obtained peak-to-peak value stored in the memory is calculated and the difference is added to or subtracted from the peak-to-peak value stored in the memory, thereby integrating the peak-to-peak value. At the next decision step 304, by determining whether the difference becomes smaller than a predetermined value or not, it is determined whether or not the integrated data, namely, the peak-to-peak value stored in the memory is stable or not. If the determined result is not stable as represented by a NO at step 304, the routine goes back to step 301 and the foregoing steps in the sub-routine are repeatedly executed until the peak-to-peak value becomes stable. The routine is returned to the main routine when it is stabilized.

The peak-to-peak value has to be measured with high accuracy. To this end, the sampling number in the A/D converters 121 and 122 is increased, or the sampling cycle is made short. In this embodiment, in addition, the rotational speed of the motor 101 is slightly fluctuated so that the positions of the maximum and minimum values of the waveforms of the signals $DT_A$ and $DT_B$ may be sampled with ease. To this end, as shown in FIG. 4, there is provided a switching circuit 129 and a fluctuating speed reference data REFN is generated from the automatic adjusting control circuit 123. Then, upon automatic adjustment, instead of the correct speed reference data REF, the fluctuating speed reference data REFN is supplied through the switching circuit 129 to the speed servo signal forming circuit 114.

Alternatively, the speed reference data is not fluctuated but the sampling cycles in which the signals $DT_A$ and $DT_B$ are sampled by the A/D converters 121 and 122 may be changed.

If the peak-to-peak values of the signals $DT_A$ and $DT_B$ having the phases A and B are obtained as described above, according to the main routine, the control signal to be supplied to the gain adjusting circuits 124 and 125 are obtained from the peak-to-peak values of the signals $DT_A$ and $DT_B$ having the phases A and B, the output of the speed measuring circuit 126 and the output from the cycle measuring circuit 104. More specifically, at step 203, the level gains to be supplied to the gain adjusting circuits 124 and 125 are calculated. FIG. 8 is a flow chart of the gain adjusting routine at step 203 in the flow chart of FIG. 6.

The gain adjustment is effected on the basis of the principle that the speed data provided as the speed measured output and the speed data provided as the cycle measured output become equal eventually. This will be described more fully with reference to the flow chart of FIG. 8.

Referring to FIG. 8, a ratio between the speed data from the speed measuring circuit 126 and the speed data from the cycle measuring circuit 104 is calculated at step 401. Then, a difference between the resultant speed data ratio and the previously-calculated speed data ratio stored in the memory is calculated, and the speed data ratio is integrated by adding to or subtracting from the speed data ratio stored in the memory the calculated difference at step 402. It is determined at the next decision step 403 whether or not the speed data ratio stored in the memory is larger than 1. The speed data from the speed measuring circuit 126 is proportional to the gain so that if the speed data ratio is larger than 1 as represented by a YES at step 403, or the speed data from the speed measuring circuit 126 is larger, the gain adjusting signal which decreases the gain for the signal having one phase, for example, the signal DT A having the phase A is supplied to the gain adjusting circuit 124 at step 404. If it is determined that the speed data ratio is smaller than 1 as represented by a NO at the decision step 403, or the speed data from the speed measuring circuit 126 is smaller, the gain control signal which increases the gain for the signal $DT_A$ having the phase A is supplied to the gain adjusting circuit 124, at step 405.

The gain for the signal $DT_B$ having the phase B is obtained by calculating a ratio between the peak-to-peak value of the signal $DT_A$ having the phase A and the peak-to-peak level of the signal $DT_B$ having the phase B at step 406 and by multiplying the resultant ratio with the gain of the signal $DT_A$ having the phase A at step 407.

After the gains for the signals $DT_A$ and $DT_B$ having the phases A and B are adjusted, it is determined at the next decision step 408 whether a difference between the stored speed data ratio and the speed data ratio obtained last is less than a predetermined value or whether or not the integrated data of the speed data ratio is stabilized. If the difference is beyond the predetermined value, the sub-routine goes back to step 401, and the foregoing steps are repeatedly executed. If the difference becomes less than the predetermined value, the sub-routine returns to the main routine shown in FIG. 6.

In the main routine of FIG. 6, the processing enters the routine (step 204) in which it is determined whether the measured and adjusted values are satisfactory or not. These determinations are effected by checking whether or not five parameters fall within the tolerance range as shown in a flow chart of FIG. 9. Thus, it is determined whether the rotation detecting element 102 is satisfactory or not.

Referring to FIG. 9, it is determined at decision step 501 whether or not the peak-to-peak values of the signals $DT_A$ and $DT_B$ having the phases A and B fall within the standardized values. If the answer is YES, it is determined at the next decision step 502 whether or not the ratio between the peak-to-peak values of the signals $DT_A$ and $DT_B$ having the phases A and B falls within $1 \pm d_1$ ($d_1$ represents a predetermined tolerance value). If the ratio is less than $1 \pm d_1$ as represented by a YES at step 502, the sub-routine proceeds to the next decision step 503. At step 503, it is determined whether the gains for the signals having the phases A and B are abnormal or not. If they are not abnormal as represented by a YES at step 503, a ratio between the gains of the signals having the phases A and B is calculated and it is determined at step 504 whether or not the gain ratio is abnormal. If it is not abnormal as represented by a YES at step 504, it is determined at the next decision step 505 whether or not a ratio between the speed data from the cycle measuring circuit 104 and the speed data from the speed measuring circuit 126 is less than $1\pm d_2$ ($d_2$ represents the tolerance value). If it is less than $1\pm d_2$, or the checked results at steps 501 to 505 are all satisfactory, the answer is [OK] and the sub-routine in FIG. 9 returns to the main routine. If on the other hand the checked result is not good at any one step in the steps 501 to 505, the checking succeeding to that step is not executed and an answer is [NG] and the sub-routine returns to the main routine shown in the flow chart of FIG. 6.

In the main routine shown in FIG. 6, it is determined at decision step 205 whether the result at the decision step 204 is [OK] or not. If it is [OK], it is determined that the automatic gain adjustment is completed and this fact is, for example, displayed. If on the other hand the result is [NG], it is determined that the automatic gain adjustment is not satisfactory or is impossible and an alarm, for example, is made.

Figure 10:
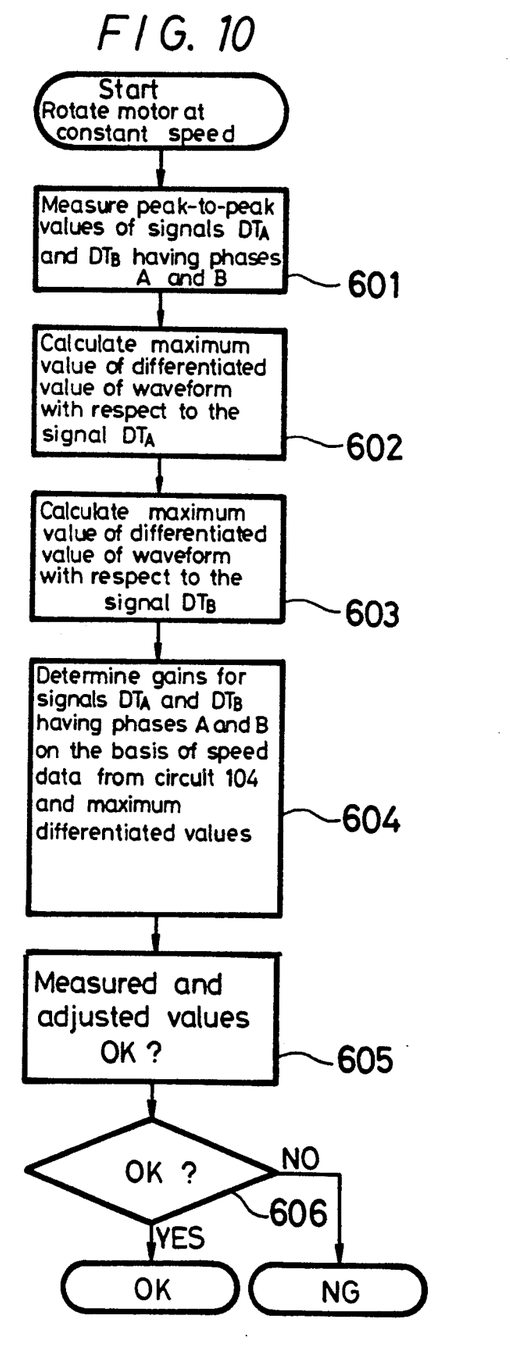

FIG. 10 shows a flow chart of another automatic gain adjusting method.

According to this method, under the condition that the motor 101 is rotated at a constant speed, maximum differentiated values (maximum grades) of the rotation detecting signals $DT_A$ and $DT_B$ having the phases A and B are controlled to fall within predetermined values with reference to the speed data from the cycle measuring circuit 104.

Referring to FIG. 10, under the condition that the motor 101 is rotated at the constant speed, the peak-to-peak values of the signals $DT_A$ and $DT_B$ having the phases A and B are obtained at step 601. This processing is effected in accordance with the sub-routine shown in FIG. 7.

Then, the maximum value of the differentiated value of the waveform with respect to the signal $DT_A$ is calculated at step 602. This maximum value is obtained in such a manner that the values of the signal $DT_A$ at two time points distant by the time $\tau$ are sampled by a plurality of times per cycle of the signal $DT_A$ and the maximum level reference between the two time points is obtained as the above maximum value.

Similarly, the maximum value of the differentiated value of the waveform with respect to the signal $DT_B$ having the phase B is calculated at step 603.

Then, the gains for the signals $DT_A$ and $DT_B$ having the phases A and B are determined on the basis of the speed data from the cycle measuring circuit 104 and the maximum differentiated values of the signals $DT_A$ and $DT_B$ having the phases A and B at step 604. Since the motor 101 is rotated at the constant speed, the maximum differentiated value in that constant speed must become a predetermined constant value. Thus, the gains for the signals $DT_A$ and $DT_B$ having the phases A and B are determined in such a manner that the maximum differentiated values become the predetermined constant value.

After the gains are determined as described above, it is determined in step 605 whether or not the measured and adjusted values are satisfactory. This determination is carried out by adding a step for checking a relationship between the peak-to-peak values of the signals having the phases A and B and the maximum differentiated values to the decision routine shown in FIG. 9.

Similar to the main routine shown in FIG. 6, it is determined at decision step 606 whether the checked result at step 605 is [OK] or not. If an answer is [OK], it is decided that the automatic gain adjustment is finished and this is, for example, displayed to indicate the same. If on the other hand the answer is [NG], it is decided that the automatic gain adjustment is not satisfactory or is impossible and this is displayed to indicate the same. It is needless to say that the circuit of the present invention can be simplified by utilizing a microcomputer.

Furthermore, in the motor such as the capstan motor for the video tape recorder having a time period in which the motor is not used, if such time period is used to perform the automatic gain adjustment, the rotational speed of the motor can be detected while temperature fluctuations, aging changes and so on of the rotation detecting element are always compensated for.

It should be understood that the above description is presented by way of example on the preferred embodiments of the invention and it will be apparent that many modifications and variations thereof could be effected by one with ordinary skill in the art without departing from the spirit and scope of the novel concepts of the invention so that the scope of the invention should be determined only by the appended claims.

We claim as our invention:

1. A servo system for a motor having a rotor comprising:
    phase detector means for detecting a rotational phase of said rotor and for defining a plurality of angular positions of said rotor during one complete rotation thereof, each angle between adjacent said angular positions being nominally of the same size;
    rotating means for rotating said rotor at a predetermined constant rotational speed;
    speed detector means for detecting a rotational speed of said rotor at each of said angular positions, said speed detector means being subject to the possibility of making detection errors of respectively different and irregularly changing magnitudes at each of said angular positions when sad rotor is rotated at said predetermined constant rotational speed;
    error detector means for detecting said detection errors of said speed detector means at each of said angular positions when said rotor is rotated at said predetermined constant rotational speed;
    memory means for storing said detection errors at each of said angular positions; and
    servo means responsive to said memory means and to said speed detector means for controlling a rotational speed and/or phase of said rotor in accordance with the rotational speed detected by said speed detector means and said respective detection errors read from said memory means in such a manner as to compensate separately for each of said respective detection errors.

2. A servo system for a motor having a rotor according to claim 1, wherein said phase detector means comprises a pulse generator for generating a pulse per revolution of said rotor at a reference angular position, and a frequency generator for generating a frequency signal whose frequency is proportional to the rotational speed of said rotor.

3. A servo system for a motor having a rotor according to claim 1, wherein said speed detector means detects a period of time in which said rotor rotates for a predetermined angle.

4. A servo system for a motor having a rotor according to claim 2, wherein said speed detector means comprises oscillating means for generating a clock signal, counter means for counting said clock signal, latch means for latching a content of said counter means in response to said frequency signal generated by said frequency generator, and calculating means for calculating time in which said rotor rotates between two adjacent said angular positions based on an output of said latch means.

5. A servo system for a motor having a rotor comprising:

frequency generator means for generating a recurrent signal which is cyclical and has generally linear portions, the frequency of said recurrent signal being proportional to a rotational speed of said rotor;

first speed detector means for detecting the rotational speed of said rotor by detecting a period of time in which said rotor rotates through a predetermined angle and for outputting a first speed signal;

second speed detector means for detecting the rotational speed of said rotor by detecting a slope of said linear portion of said recurrent signal and for outputting a second speed signal;

comparing means responsive to said first and second speed signals for comparing said first and second speed signals and for outputting a compared result;

gain control means for controlling a gain of said recurrent signal according to said compared result of said comparing means so that said first and second speed signals become equal; and servo control means responsive to the compared result for controlling the rotational speed of said rotor according to one of said first and second speed signals so as to compensate for variations in said compared result.

6. A servo system for a motor having a rotor according to claim 5, further comprising selecting means for selecting one of said first and second speed signals such that said first speed signal is selected when the rotational speed of said rotor is greater than a predetermined rotational speed and said second speed signal is selected when the rotational speed of said rotor is less than said predetermined rotational speed, said servo control means controlling the rotational speed of said rotor in accordance with a selected one of said first and second speed signals.

7. A servo system for a motor having a rotor according to claim 5, further comprising selecting means for selecting one of said first and second speed signals such that said second speed signal is selected when the rotational speed of said rotor is less than a predetermined rotational speed and when a slope of the rotational speed of said rotor is greater than a predetermined value, said slope being detected by determining the difference between said first and second speed signals detected by said comparing means.

8. A servo system for a rotor having a rotor comprising:

a frequency generator coupled to said rotor for generating first and second signals in response to rotation of said rotor, each of said first and second signals being cyclical and having generally linear portions separated by nonlinear portions, the frequency of said first and second signals being proportional to the rotating speed of said rotor, and said first and second signals being angularly displaced from each other so that the nonlinear portions of one occur respectively approximately in the middle of the linear portions of the other;

first speed detector means for detecting a rotational speed of said rotor by detecting time in which said rotor rotates for a predetermined angle and for outputting a first speed signal;

second speed detector means for detecting the rotational speed of said rotor by detecting a slope of said linear portions of said first and second signals and for outputting a second speed signal;

comparing means responsive to said first and second speed signals for comparing said first and second speed signals and for outputting a compared result; and gain control means for controlling gains of said first and second signals according to said compared result so that variations therein are compensated for and said first and second speed signals become equal.

9. A servo system for a motor having a rotor according to claim 8, wherein said second speed detector means detects the rotational speed of said rotor by selecting a maximum slope of said first and second recurrent signals.

10. A servo system for a motor having a rotor comprising:

frequency generator means for generating a signal which is cyclical and has generally linear portions, the frequency of said signal being proportional to a rotational speed of said rotor;

speed detector means for detecting the rotational speed of said rotor by detecting a slope of said linear portions of said signal;

peak detector means for detecting a peak-to-peak value of said signal;

gain control means for controlling a gain of said signal according to an output of said peak detector so that said peak-to-peak value of said signal becomes equal to a predetermined value;

means for generating a speed reference signal; and servo control means connected to said speed detector means and said means for generating a speed reference signal for controlling the rotational speed of said rotor in accordance with an output of said speed detector means and said speed reference signal so as to compensate for variations of the output of said speed detector means from said speed reference signal.

* * * * *

UNITED STATES PATENT AND TRADEMARK OFFICE
CERTIFICATE OF CORRECTION

PATENT NO. : 5,304,907
DATED : April 19, 1994
INVENTOR(S) : Fumiyoshi Abe, Takayuki Horikoshi and Akira Hasegawa It is certified that error appears in the above-indentified patent and that said Letters Patent is hereby corrected as shown below:

```
Col. 1, line 37, change "the-phase" to --the phase--
Col. 3, line 15, change "other" to --another--
Col. 5, line 34, after "C_2" insert --,-- line 45, after "S_5" first occurrence, insert --,--

Col. 8, line 55, change "tm" to --t_m--

Col. 9, line 1, after "C_{m1}+" insert --...-- line 34, change "Step" to --At step--
Col. 10, line 34, change "circui" to --circuit--
         line 56, change "signal" to --signals--
Col 14, line 19, change "DT A" to --DT_A--

Col. 16, line 41, change "sad" to --said--
Col. 18, line 1, change "rotor" first occurrence to --motor--
```

Signed and Sealed this

Sixteenth Day of January, 1996

Attest:

BRUCE LEHMAN

*Attesting Officer*           Commissioner of Patents and Trademarks